United States Patent
Lee

(10) Patent No.: US 7,293,215 B2
(45) Date of Patent: Nov. 6, 2007

(54) RADIO PACKET DATA TRANSMISSION CONTROL SYSTEM AND METHOD

(75) Inventor: Sang Ho Lee, Gyeonggi-Do (KR)

(73) Assignee: LG Nortel Co., Ltd., Seoul (KR)

( * ) Notice: Subject to any disclaimer, the term of this patent is extended or adjusted under 35 U.S.C. 154(b) by 361 days.

(21) Appl. No.: 10/653,156

(22) Filed: Sep. 3, 2003

(65) Prior Publication Data
US 2004/0042465 A1  Mar. 4, 2004

(30) Foreign Application Priority Data
Sep. 4, 2002  (KR) ............. 10-2002-0053146

(51) Int. Cl.
*H04L 1/18* (2006.01)
(52) U.S. Cl. ............. 714/748; 714/749; 370/348
(58) Field of Classification Search ........... 370/230
See application file for complete search history.

(56) References Cited

U.S. PATENT DOCUMENTS

| | | | |
|---|---|---|---|
| 6,694,471 B1* | 2/2004 | Sharp | 714/749 |
| 6,757,245 B1* | 6/2004 | Kuusinen et al. | 370/230 |
| 6,757,248 B1* | 6/2004 | Li et al. | 370/235 |
| 6,920,128 B1* | 7/2005 | Haugli et al. | 370/348 |
| 6,980,514 B2* | 12/2005 | Grob et al. | 370/230 |
| 7,103,817 B1* | 9/2006 | Choksi | 714/748 |
| 2002/0154602 A1* | 10/2002 | Garcia-Luna-Aceves et al. | 370/230 |
| 2003/0099197 A1* | 5/2003 | Yokota et al. | 370/230 |
| 2003/0137948 A1* | 7/2003 | Komandur et al. | 370/315 |
| 2003/0179720 A1* | 9/2003 | Cuny | 370/310 |
| 2005/0041581 A1* | 2/2005 | Kuusinen et al. | 370/230 |

* cited by examiner

*Primary Examiner*—Guy Lamarre
*Assistant Examiner*—Sam Rizk
(74) *Attorney, Agent, or Firm*—Ked & Associates, LLP

(57) ABSTRACT

A system and method for controlling transmission of a radio packet data are disclosed. A time point when a congestion controlling mechanism, causing a TCP performance degradation with the mobile station and the PDSN, is previously detected, and when the mechanism is operated, it is quickly returned. Thus, in spite of a bit error (data loss) existing due to the characteristics of the radio data service, a reliable data service can be guaranteed.

19 Claims, 4 Drawing Sheets

RADIO PACKET DATA TRANSMISSION CONTROL SYSTEM AND METHOD

BACKGROUND OF THE INVENTION

1. Field of the Invention

The present invention relates to a radio packet data communication and, more particularly, to a system and method for controlling transmission of a radio packet data by using a transmission control protocol (TCP).

2. Description of the Background Art

In general, the TCP, a protocol widely used for a reliable data transmission, can be applied to various networks of the Internet. However, the performance of TCP is much degraded In a radio environment compared to a cable environment. The reason is because the bit error rate is high and a path is frequently changed due to a fading and a handoff, and if data loss is generated in the radio environment having a variable bandwidth, the TCP would determine that the data loss is caused by a network congestion and operate a congestion control mechanism.

This is because, in data protocol structure of a radio data service, as an upper TCP can not recognize whether a lower network section is a wireless section or a wired section, a radio link protocol (RLP), a lower network section, can not recognize which protocol is an upper layer.

Therefore, because the data protocol of the radio data service has such a structure that the RLP, the lower layer, can not transmit a transmission error of a radio section to the TCP, the upper layer, the TCP recognizes the transmission error as a network congestion and reduces the size of a transmission window to reduce data transmission. This causes degradation of performance between TCPs. Thus, without directly correcting the TCP so as not to operate the unnecessary congestion control mechanism, performance degradation of the TCP is inevitable.

FIG. 1 illustrates data protocol structure of a radio data service.

As shown in FIG. 1, the data protocol structure includes an RLP layer, a PPP (Point to Point Protocol) layer, an IP (Internet Protocol) layer, a TCP layer and an application layer.

When a user requests radio data service through a mobile station 101, a base station 102 performs a basic call setup process and an RLP setup process, and then opens a traffic path between a packet data serving node (PDSN) 103 and the mobile station 101. Then, the mobile station 101 is assigned an IP from the PDSN 103 through a PPP setup process of end PPPs, and is connected to an Ethernet network.

The RLP is a not-acknowledge (NAK)-based protocol devised for reducing an error rate generated during data transmission, including an RLP1 for IS-95A, an RLP2 for IS-95B, and an RLP3 for IS-2000.

In addition, in order to perform a PPP setup process between end PPPS, a relay layer is set up between the base station 102 and the PDSN 103, and the relay layer is described according to an IS-95 series standards for inter-facing of air area.

That is, as shown in FIG. 2, when the packet data service is requested by the mobile station 101, data receiving block 110 of the base station 102 receives data from the PDSN 104 and transmits it to a RLP processing block 120. Then, the RLP processing block 120 processes the new data received from the data receiving block 110 according to the RLP protocol and transmits it to the mobile station 130. At this time, the new data is stored in a re-transmission buffer 21 and a temporary buffer 20.

During the packet data transmission, when re-transmission of data is requested by the mobile station 130, the RLP processing block 120 re-transmits the data frame stored in the temporary buffer 20.

The conventional radio packet data transmission method using the transmission control protocol will now be described with reference to FIG. 3

As shown in FIG. 3, the data receiving block 110 receives data from the PDSN (step S101) and transmits it to the RLP processing block 120.

Then, the RLP processing block 120 stores the received data in the re-transmission buffer 21 (step S103), performs an RLP processing on it, and transmits the processed RLP data to the mobile station 130 by using the RLP protocol At this time, the RLP processing block 120 checks whether an NAK (Not Acknowledge) signal has been received from the mobile station 130 over the RLP data (step S109), that is, whether data re-transmission has been requested.

If there is no data re-transmission request, the data receiving block 110 continuously receives data from the PDSN (step S101). If, however, there is data re-transmission request, the data receiving block 110 re-transmits RLP data corresponding to a corresponding sequence from the re-transmission buffer 21 (step S111).

When the radio packet data service is used, the upper protocol is determined depending on a service that the mobile station 130 is provided with. In this respect, however, the RLP layer can not know information about the protocol of the upper layer, it transmits data with the same priority for every protocol.

That is, when a user receives data service using the TCP, the application layer capsulizes the user data by the TCP/IP. The capsulized data undergoes a PPP processing, divided according to an air section, undergoes an RLP processing, and is then transmitted to the mobile station 130 through a radio interface section.

While the RLP layer is transmitting sequential data according to the NAK based protocol, if a lost sequence is generated, the RLP layer transmits an NAK control frame to the sending side (base station), so as to receive data for the corresponding sequence from the base station. In preparation for a case that a re-transmitted frame is lost again, a rounding number is set so the base station performs re-transmission several times.

If, however, re-transmitted data is continuously lost, the mobile station aborts an RLP frame of a corresponding sequence, and sends an RLP frame of the next sequence to the upper layer (PPP→IP→TCP). If data does not have the RLP frame because of its loss, the PPP layer determines it as an error through a cyclic redundancy check (CRC), so the full frame is not transmitted to the TCP/IP layer.

Therefore, failing to receive the full frame, the TCP determines that the network is congested and operates a congestion control alrogithm, resulting in that the size of a transmission window is reduced and thus data transmission is reduced.

In other words, some transmission errors between the RLP ends causes a congestion control between the entire TCPs. However, the transmission error between the RLP ends occurs frequently in the radio section, so the TCP's congestion control may occur in great numbers in areas with a bad radio environment.

The problem is that the TCP, the upper layer, is made suitable for a cable environment which has little transmission error, whereas the RLP, the lower layer, does not have any information about the upper layer and is made suitable for a radio environment. Thus, with the current protocol structure where there is no communication between the TCP and the RLP, there is no way for the RLP to inform the TCP about the transmission error.

Accordingly, because the TCP can not discriminate case that the transmission error occurs and a case that the network congestion occurs, the transmission error at the RLP terminal can be mistakenly recognized as the network congestion. This would cause to operate of the unnecessary congestion control mechanism of the TCP. Then, the transfer rate is degraded and a reliable data service to users can be hardly expected.

The above references are incorporated by reference herein where appropriate for appropriate teachings of additional or alternative details, features and/or technical background

SUMMARY OF THE INVENTION

Therefore, an object of the present invention is to provide a system and method for controlling radio packet data transmission capable of preventing data loss due to a handoff or a bit error in a radio link protocol and a radio section from operating as a congestion control mechanism at a TCP terminal.

Another object of the present invention is to provide a system and method for controlling radio packet data transmission using a transmission control protocol capable of quickly returning to a normal state when a congestion control mechanism is operated in a TCP terminal.

To achieve at least the above objects in whole or in parts, there is provided a method for controlling radio packet data transmission in a wireless system in which packet data is transmitted by using a transmission control protocol (TCP), including: transmitting a packet data from a fixed station to a mobile station; checking whether a TCP congestion controlling is performed on the basis of the number of requests for re-transmission from the mobile station and data rate change; and automatically re-transmitting a packet data when the TCP congestion controlling is performed.

Preferably, the data re-transmission is made irrespective of the mobile station's request.

Preferably, the fixed station is a base station.

Preferably, the packet data is a radio link protocol data.

Preferably, the checking step includes: checking a bit error possibility by counting the number of requests for re-transmission from the mobile station on the same sequence for a predetermined time; measuring a current data rate if there is a bit error possibility; and checking whether a TCP congestion control is performed by comparing the measured data rate with a reference rate.

Preferably, if the current data rate is smaller than the reference rate, it is determined that the TCP congestion controlling is being performed.

The radio packet data transmission controlling method further includes: stopping all monitoring if it is determined that the TCP congestion controlling is not being performed. In addition, the radio packet data transmission controlling method may further include: transmitting a virtual signal to the mobile station and an upper server in order to stop a congestion controlling if the TCP congestion controlling is being performed.

Preferably, the virtual signal is transmitted through an Internet control message protocol (ICMP).

To achieve at least these advantages in whole or in parts, there is further provided a method for controlling radio packet data transmission in a wireless system in which packet data is transmitted by using a transmission control protocol (TCP), including: transmitting packet data from a fixed station to a mobile station; determining whether there is a bit error possibility by counting requests for re-transmission from the mobile station; determining whether a TCP congestion controlling is being performed by checking a current data rate if there is a bit error possibility; automatically re-transmitting packet data to the mobile station if it is determined that the TCP congestion controlling is being performed.

Preferably, if the current data rate is smaller than the reference rate, it is determined that the TCP congestion controlling is being performed.

Preferably, the data re-transmission is automatically made irrespective of the mobile station's request.

Preferably, if it is determined that the TCP congestion controlling is being performed, the fixed station transmits packet Internet grouper (PING) data to the mobile station.

To achieve at least these advantages in whole or in parts, there is further provided a system for controlling radio packet data transmission in a wireless system in which packet data is transmitted by using a transmission control protocol (TCP), including: data receiving unit for receiving packet data from a packet serving node; a controller for storing the received data and transmitting it to a lower layer, and controlling a congestion control mechanism on the basis of a current data rate change if a bit error possibility signal is inputted; and a radio link processing unit for processing the packet data received from the controller to transmit it to a mobile station, and counting requests for re-transmission from the mobile station and transmitting a bit error possibility signal to the controller.

Preferably, the radio link processing unit counts the requests for re-transmission from the mobile station, and if the requests for re-transmission for the same sequence is greater than a predetermined number, the radio link processing unit transmits the bit error possibility signal to the controller.

Preferably, the controller monitors a current data rate from a time point when the bit error possibility signal is inputted, and determines an operation of the TCP congestion control mechanism according to a change in the data rate.

Preferably, if the TCP congestion control mechanism is determined to be operated, the controller transmits the previously stored packet data to the radio link processing unit so as to be transmitted to the mobile station.

Preferably, if it is determined that the TCP congestion controlling is currently being performed, the controller transmits a virtual signal to the mobile station and an upper server in order to stop the congestion controlling.

Preferably, the virtual signal is transmitted through an Internet control message protocol (ICMP).

Additional advantages, objects, and features of the invention will be set forth in part in the description which follows and in part will become apparent to those having ordinary skill in the art upon examination of the following or may be learned from practice of the invention The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
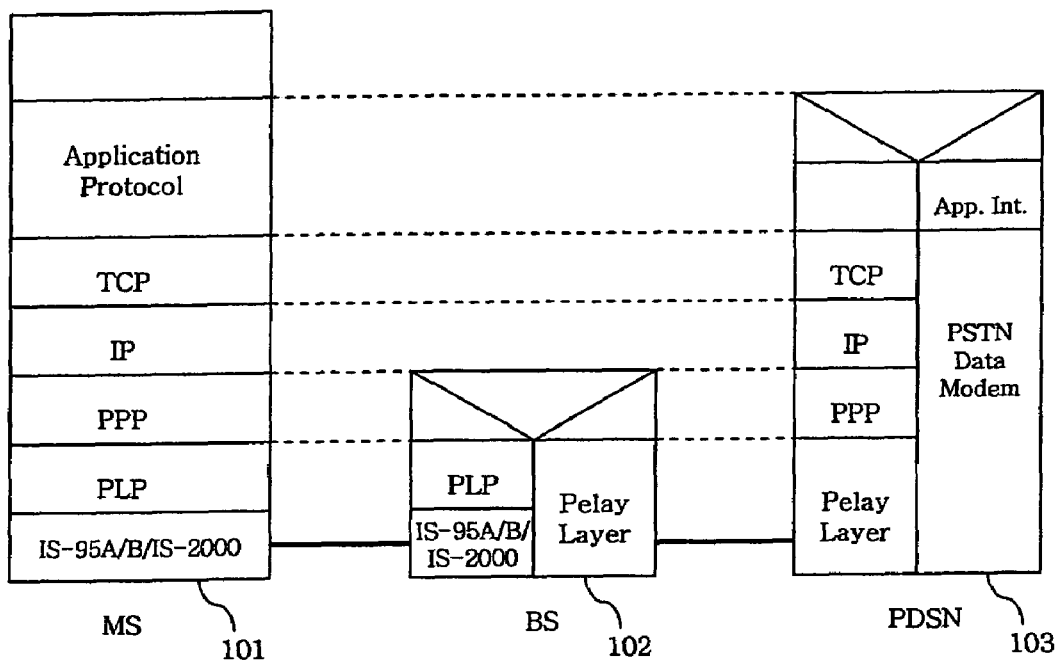
FIG. 1 illustrates data call connection protocol in a mobile communication system.
Figure 2:
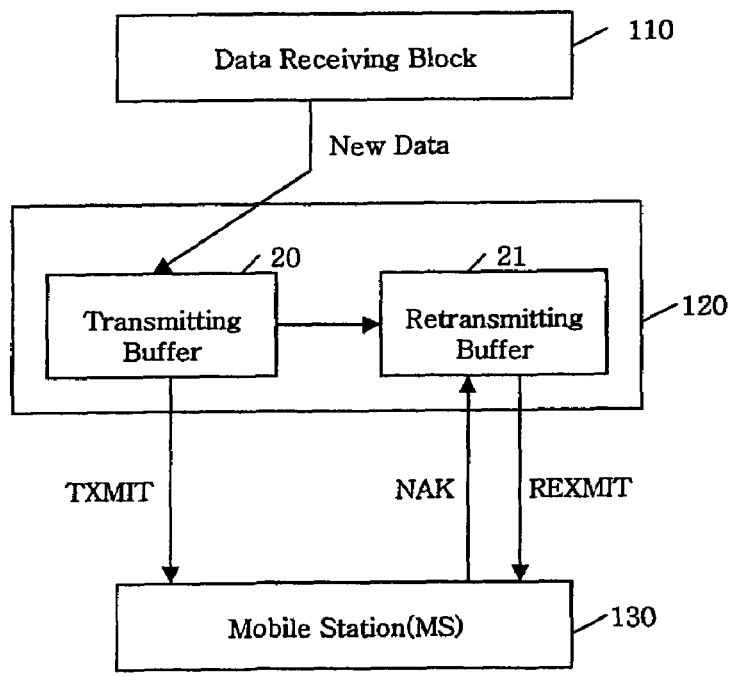
FIG. 2 illustrates transmission block of radio packet data using a transmission control protocol in accordance with a conventional art.
Figure 3:
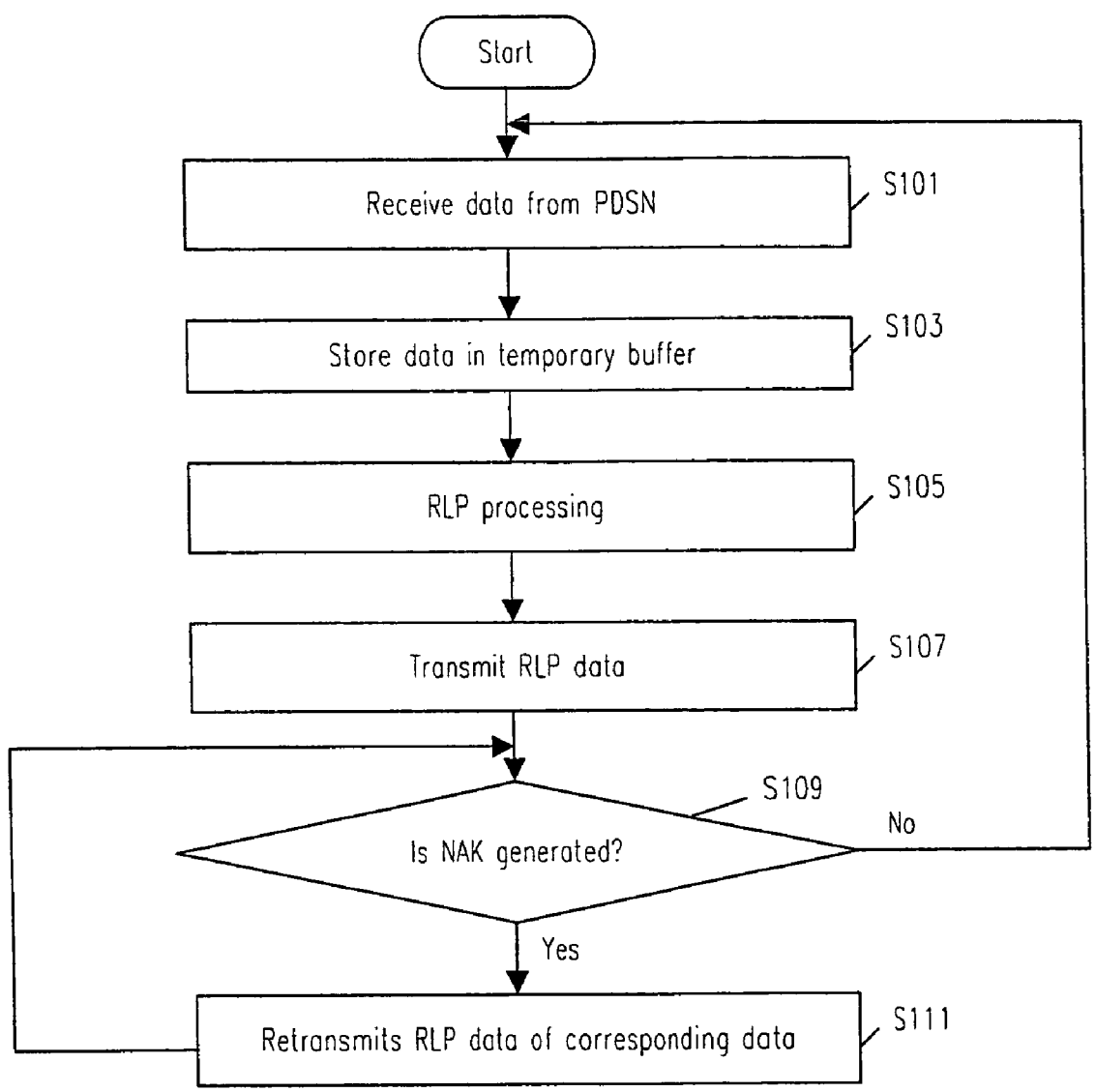
FIG. 3 is a flow chart of a method for transmitting radio packet data using the transmission control protocol in accordance with the conventional art.
Figure 4:
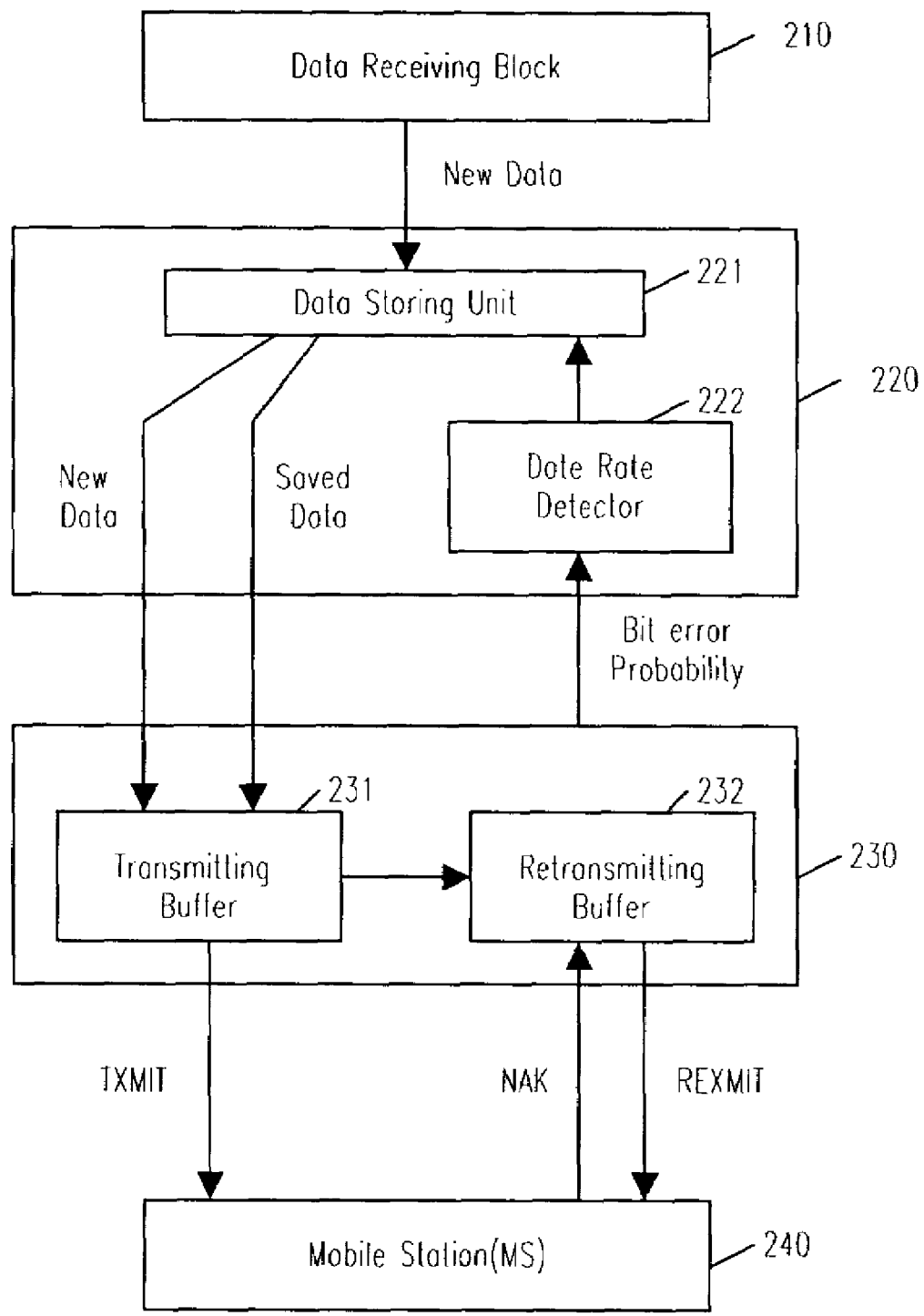
FIG. 4 illustrates transmission control block of radio packet data using a transmission control protocol in accordance with a preferred embodiment of the present invention.

FIG. 4 illustrates transmission control block of radio packet data using a transmission control protocol in accordance with a preferred embodiment of the present invention.

With reference to FIG. 4, the transmission control block of a radio packet data of the present invention includes: data receiving block 210 for receiving data from a packet serving node; a control block 220 for storing data received from the data receiving block 210 and transmitting new data and the stored data according to data rate checking result; an RLP processing block 230 for transmitting data received from the control block 220 to a mobile station 240 according to a radio link protocol (RLP), and transmitting a bit error possibility to an upper control block if requests for re-transmission occur above a reference number; and the mobile station 240 for receiving data from the RLP processing block 230, and requesting re-transmission from the RLP processing block 230 for a non-received sequence number.

The data receiving block 210, the control block 220 and the RLP processing block 230 are included in a base station system (BSS) positioned between a packet serving node (PSDN) connecting to the Internet and the mobile station 240.

The radio packet data transmission control block using the transmission control protocol will now be described with reference to the accompanying drawings.

As shown in FIG. 4, the mobile station 240 undergoes a radio link protocol (RLP) initialization process with the base station system in order to request a packet data service.

Once the RLP initialization is performed, the base station is connected to the packet service node (PSDN) to perform a PPP setup process. At this time, the base station system detects an IP of the mobile station 240.

The IP address of the mobile station 240 can send a virtual PING (Packet Internet Grouper) data to the mobile station 240 when a bit error occurs. The PING data is an indirect signal for stopping the congestion controlling, that is, information that a current network is not congested. Such PING consists of an IP and an ICMP (Internet Control Message Protocol).

The virtual signal for interrupting the congestion controlling is transmitted to the upper server and the mobile station 240 by using the ICMP. The ICMP is a portion of the IP layer and used by the TCP, an upper layer of the IP, or the UDP (User Datagram Protocol). Thereafter, the mobile station 240 receives data service with the assigned IP from the upper server through the PDSN.

In detail, as shown in FIG. 4, in order to transmit the packet data, the base station system includes the data receiving block 210, the control block 220 and the radio link protocol (RLP) processing block 230.

The data receiving block 210 receives packet data (new data) from the upper packet serving node (PSDN) and transmits it to the control block 220. Then, the control block 220 stores the received data in the data storing unit 221 and transmits the new data to the RLP processing block 230.

The RLP processing block 230 divides the data according to the RLP protocol and transmits it to the mobile station 240 through a radio interface, so that the mobile station 240 can receive the packet data service from the base station.

At this time, by referring the sequence number of data received from the RLP processing block 230, if there is a lost packet in a sequential data, the mobile station 240 informs the RLP processing block 230 of the number of lost sequence by using the re-transmission (NAK)-based protocol.

When the NAK signal is transmitted from the mobile station 240, the RLP processing block 230 re-transmits a frame corresponding to the pertinent sequence number stored in the temporary buffer 232 to the mobile station 240. That is, if there occurs the NAK signal, the RLP processing block 230 performs a series of RLP process for re-transmitting the corresponding RLP frame. In other words, the RLP processing block 230 sets a reference count value of the corresponding sequence, and if repeated NAK occurs in the same sequence, the RLP processing block 230 re-transmits the RLP frame while increasing the count value.

At this time, because the RLP processing block 230 has the predetermined NAK-ROUND characteristics, if NAK of the same sequence occurs as many as a predetermined reference value, the RLP processing block 230 determines that there is a possibility that the corresponding RLP frame is lost, and informs the upper control block 220 of the bit error possibility.

Upon receiving the message of the bit error possibility from the RLP processing block 230, the control block keeps monitoring the current data rate by using the data rate checking unit 222 at the time point when there is a bit error possibility. By doing that, the control block 220 can check whether the congestion control mechanism is being currently operated in the TCP terminal according to a change in the data rate.

That is, the data rate checking unit 222 monitors the data rate for a predetermined time, and if it determines that the congestion controlling is being operated, the data rate checking unit 222 controls the data storing unit 221 so as for the PPP data stored in the data storing unit 222 to be transmitted to the RLP processing block 230. In this case, the RLP processing block 230 re-transmits data to the mobile station, even if there is no re-transmission request form the mobile station 240.

If, however, the data rate checking unit 222 determines that the congestion controlling mechanism is not being operated, it stops all monitoring.

In addition, after re-transmission of data, when the data rate checking unit 222 monitors the data rate and determines that no congestion controlling occurs, it stops transmission of PPP data.

Figure 5:
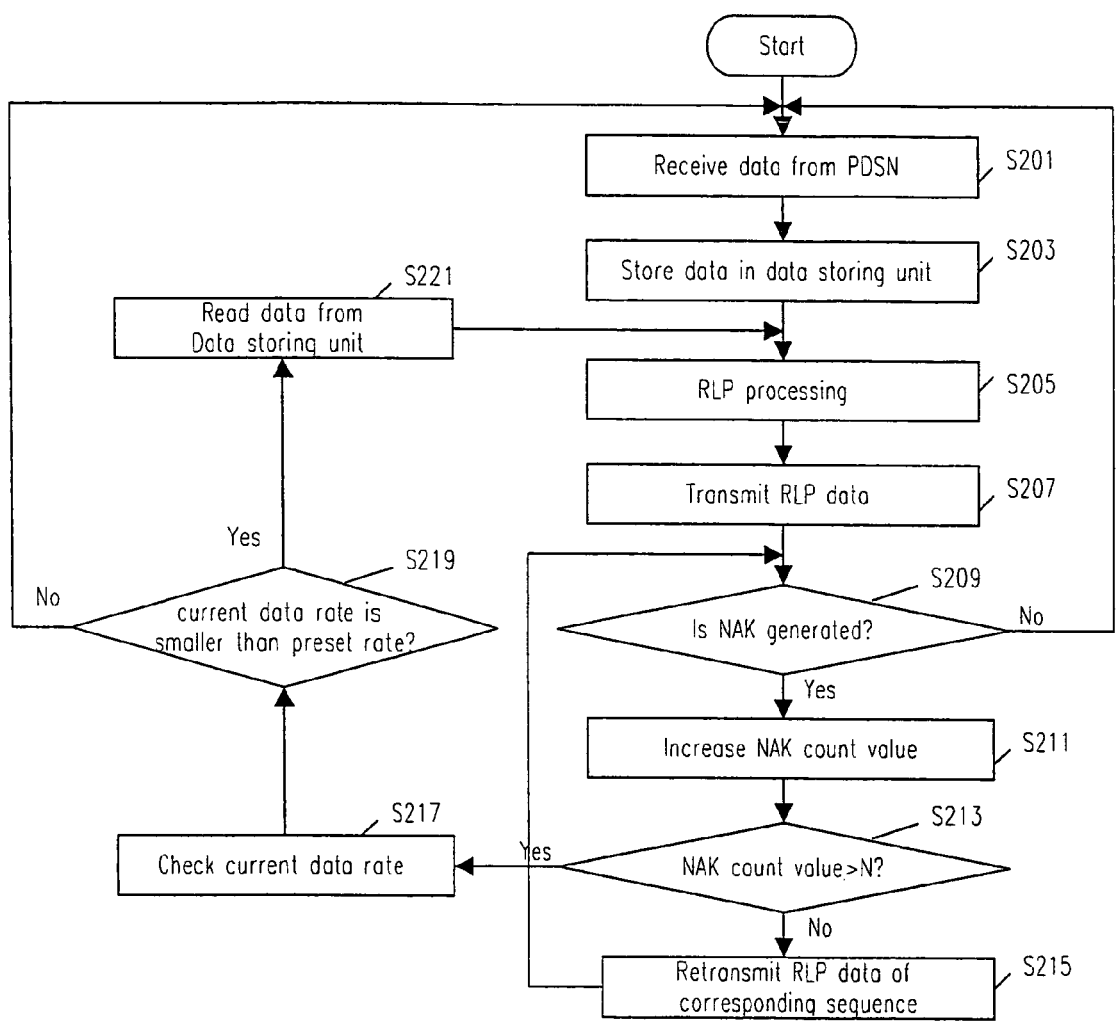
FIG. 5 is a flow chart of a method for controlling transmission of radio packet data using the transmission control protocol in accordance with the preferred embodiment of the present invention.

FIG. 5 is a flow chart of a method for controlling transmission of radio packet data using the transmission control protocol in accordance with the preferred embodiment of the present invention.

First, the mobile station 240 requesting a data service undergoes an RLP initialization process with the base station system and proceeds with the PPP setup with the PDSN. At this time, the base station system detects an IP of the mobile station 240.

In case of using the data service with the IP assigned from the mobile station 240, the data receiving block 210 receives data from the PDSN, checks whether the data has an error (CRC) verification of the PPP layer, stores it in the data storing unit 221 and simultaneously transmits it to the control block 220 (steps S201 and S203). This is to re-transmit the last PPP (i.e., the TCP/IP data) when a bit error occurs.

The control block 220 transmits the data received from the data receiving block 210 to the RLP processing block 230. And then, the RLP processing block 230 stores the received data in the transmission buffer 231 and the temporary buffer 232, and transmits a processed RLP data to the mobile station 230 (steps S205 and S207).

Thereafter the RLP processing block 220 checks whether a re-transmission request, that is a NAK signal, is received from the mobile station 240 (step S209), and if the re-transmission is requested, the RLP processing block 220 performs a series of RLP processes for re-transmission of a corresponding RLP frame. Meanwhile, if a re-transmission is not requested, the operations after the step S201 are performed.

That is, when the NAK signal is received from the mobile station 240, the RLP processing block 230 increases the NAK count value of a corresponding sequence (step S211), and compares the increased NAK count value of the sequence with a predetermined reference value (NAK_ROUND=N) (step S213).

If the NAK count value for the same sequence is smaller than the predetermined reference value, the RLP processing block 230 re-transmits RLP data of the corresponding sequence (step S215), and then performs the operations after the step S209.

If, however, the NAK count value for the same sequence exceeds the predetermined reference value, the RLP processing block 230 determines a possibility that the corresponding RLP frame can be lost, and transmits a bit error possibility signal to the control block 220.

Upon receiving the bit error possibility signal from the RLP processing block 230, the control block 220 keeps monitoring a current data rate at the time point where there is a bit error possibility to check whether the congestion controlling mechanism is being operated in the TCP layer (step S217).

In other words, the data rate checking unit 222 of the control block 220 checks whether the current data rate is smaller than the pre-set rate for a predetermined time (step S219). If the current data rate is not smaller than the pre-set data rate, that is, if the congestion controlling is not being operated, the data rate checking unit 222 stops all monitoring.

If, however, the current data rate is smaller than the pre-set data rate, the data rate checking unit 222 determines that the congestion controlling is currently being operated, and transmits PPP data finally stored in the data storing unit 221 to the RLP processing block 230. Accordingly, the RLP processing block 230 re-transmits RLP data to the mobile station 240 even though the mobile station 240 does not request re-transmission (step S221).

In addition, the control block 220 may transmit virtual PING data to the mobile station 240 and the upper server through the ICMP. At this time, When the control block 220 transmits the virtual PING data to the mobile station 240, it uses the detected IP of the mobile station, thereby informing the TCP of an indirect signal for stopping the congestion controlling.

If the control block 220 monitors the data rate after re-transmission and determines that no congestion controlling is generated, the control block 220 stops transmission of PING and previously stored PPP data. If, however, the congestion controlling is continuously generated, the control block 220 transmits the PING data to the upper server and the mobile station 240 constantly at regular intervals for a predetermined time.

Thereafter, when the data transmission rate is normally maintained, the control block 220 receives data from the PDSN.

In this manner, considering that the cause of the performance degradation according to the congestion controlling is the bit error in the radio environment, the control block re-transmits data irrespective of the mobile station's request at the time point when the congestion controlling mechanism is operated, thereby reducing the operation possibility of the congestion controlling mechanism In addition, if there is a possibility that the bit error occurs, the control block checks whether the TCP congestion controlling is generated, and transmits the virtual signal to the TCP to stop the congestion controlling, that is, informs that a current network is not congested.

As so far described, the system and method for controlling transmission of a radio packet data by using a transmission control protocol (TCP) of the present invention has the following advantage.

That is, a time point when a congestion controlling mechanism, which causes a TCP performance degradation with the mobile station and the PDSN, is previously detected, and when the mechanism is operated, the corresponding state is quickly returned to a normal state. Thus, in spite of the bit error (data loss) existing due to the characteristics of the radio data service, a reliable data service can be guaranteed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling radio packet data transmission in a wireless system in which packet data is transmitted by using a transmission control protocol (TCP), comprising:
   transmitting a packet data from a fixed station to a mobile station;
   checking whether a TCP congestion controlling is performed on the basis of a number of retransmission requests by the mobile station and a data rate change, wherein the checking comprises:
   checking a bit error possibility by counting the number of retransmission requests from the mobile station on a same sequence for a predetermined time, measuring a current data rate if there is a bit error possibility, and checking whether the TCP congestion controlling is performed by comparing the measured data rate with a reference rate; and automatically re-transmitting a packet data when the TCP congestion controlling is performed.

2. The method of claim 1, wherein the number of re-transmission requests is a number for a same sequence.

3. The method of claim 1, wherein the packet data re-transmission is made from the fixed station irrespective of the retransmission requests by the mobile station.

4. The method of claim 1, wherein the fixed station is a base station.

5. The method of claim 1, wherein the packet data is a radio link protocol data.

6. The method of claim 5, wherein if the current data rate is smaller than the reference rate, it is determined that the TCP congestion controlling is being performed.

7. The method of claim 5, further comprising:
stopping a monitoring activity if it is determined that the TCP congestion controlling is not being performed.

8. The method of claim 5, further comprising:
transmitting a virtual signal to the mobile station and an upper server in order to stop a congestion controlling if the TCP congestion controlling is being performed.

9. The method of claim 8, wherein the virtual signal is transmitted through an Internet control message protocol (ICMP).

10. A method for controlling radio packet data transmission in a wireless system in which packet data is transmitted by using a transmission control protocol (TCP), comprising:
transmitting packet data from a fixed station to a mobile station;
determining whether there is a bit error possibility by counting re-transmission requests received from the mobile station;
determining whether a TCP congestion controlling is being performed by checking a current data rate if there is a bit error possibility; and
automatically re-transmitting packet data to the mobile station if it is determined that the TCP congestion controlling is being performed.

11. The method of claim 10, wherein if the current data rate is smaller than a reference rate, determining that the TCP congestion controlling is being performed.

12. The method of claim 10, wherein the packet data re-transmission is automatically made irrespective of the retransmission requests from the mobile station.

13. The method of claim 10, wherein if it is determined that the TCP congestion controlling is being performed, transmitting packet Internet grouper (PING) data to the mobile station from the fixed station.

14. A system for controlling radio packet data transmission in a wireless system in which packet data is transmitted by using a transmission control protocol (TCP), comprising:
data receiving unit for receiving packet data from a packet serving node;
a controller for storing the received data and transmitting it to a lower layer, and controlling a TCP congestion control mechanism on the basis of a current data rate change if a bit error possibility signal is inputted; and
a radio link processing unit for processing the packet data received from the controller to transmit it to a mobile station, and counting requests for re-transmission from the mobile station and transmitting a bit error possibility signal to the controller.

15. The system of claim 14, wherein the radio link processing unit counts the requests for re-transmission from the mobile station, and if the requests for re-transmission for a same sequence is greater than a predetermined number, the radio link processing unit transmits the bit error possibility signal to the controller.

16. The system of claim 14, wherein the controller monitors a current data rate from a time point when the bit error possibility signal is inputted, and determines whether the TCP congestion control mechanism is operated according to a change in the data rate.

17. The system of claim 16, wherein if the TCP congestion control mechanism is determined to be operated, the controller transmits a previously stored packet data to the radio link processing unit to be transmitted to the mobile station.

18. The system of claim 16, wherein if it is determined that the TCP congestion controlling is currently being performed, the controller transmits a virtual signal to the mobile station and an upper server in order to stop the TCP congestion controlling.

19. The system of claim 18, wherein the virtual signal is transmitted through an Internet control message protocol (ICMP).

* * * * *